3,534,137
METHOD OF SYSTEMIC THERAPY FOR SEVERE EARLY DESTRUCTIVE PERIODONTAL DISEASE

Toshiharu Matsumura, Nara, and Akira Tsunemitsu, Osaka, Japan, assignors to Takeda Chemical Industries, Ltd., Osaka, Japan
No Drawing. Continuation of application Ser. No. 583,418, Sept. 30, 1966. This application Jan. 16, 1969, Ser. No. 797,333
Claims priority, application Japan, Sept. 30, 1965, 40/60,094
Int. Cl. A61k *19/00*
U.S. Cl. 424—94                                   4 Claims

ABSTRACT OF THE DISCLOSURE

Periodontal disease is effectively treated with ubiquinone $5n$ wherein $n$ is 7 to 10, and more especially with ubiquinone 35 (coenzyme $Q_7$). The administration of the said compounds, particularly the latter, lowers blood citrate level in patients suffering from the disease, even in cases nonresponsive to treatment with vitamin C.

---

This is a continuation application of Ser. No. 583,418, filed Sept. 30, 1966, now abandoned.

This invention relates to a method of systemic therapy for severe early destructive periodontal disease (periodontosis) which comprises administering ubiquinone of the formula

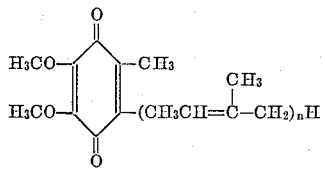

wherein $n$ is an integer from 7 to 10 inclusive, to a sufferer from the disease. Hereinafter in this specification ubiquinone is also referred to as "ubiquinone $5n$" wherein "$n$" has the same meaning as in the above formula. Ubiquinone $5n$ is also designable as Coenzyme $Qn$.

Severe destructive periodontal disease of an apparently degenerative type, with formation of deep pockets, occurs frequently in young and middle-aged women, though it may be found in the mouths of other persons. The disease is characterized by severe loss of dental supporting tissues without corresponding loss of gingival tissue and without much apparent inflammation, the destruction seeming to be out of proportion to the apparent local cause of periodontal disease. The radiographic feature is characterized by a combination of the diffuse loss of the alveolar bone, thickening of the periodontal space and absence of the lamina dura. The etiology of the disease is not known, though it is thought that systemic, as well as local, factors play a part in its initiation. The causative systemic disturbances are referred to in such general terms as metabolic imbalance, hormonal disturbances, debilitating disease, and nutritional deficiency. More specific reference to etiologic systemic disturbances includes avitaminosis, anaemia, hypertension or collagen disease.

The inventors have clearly demonstrated in many patients with severe destructive periodontal disease that (1) the citric acid content in blood is apparently elevated, (2) the amount of citric acid excreted in urine during two hours after intravenous administration of sodium citrate is significantly increased and (3) disturbed metabolism of citric acid exists.

In an animal test in which hypercitricemia was produced by injecting $\alpha,\alpha'$-dipyridyl or desoxycorticosterone (DOC) into mildly scorbutic guinea pages, the inventors have demonstrated destructive periodontal lesions resembling severe scorbutic degeneration which is considered to be an important figure as regards the development and progress of severe destructive periodontal disease. Based on these investigations, it is evident that the metabolism of periodontal tissues is depressed under the condition of hypercitricemia.

Although a few systemic therapeutic approaches have been made for the specific purpose of stimulating cellular activity in the periodontium in an effort to improve the response to local treatment, it has not become a critical reality. On the other hand, the inventors have newly found that the systemic administration of ubiquinone restores hypercitricemia to normal level in patients with severe destructive periodontal disease, and this medication is dramatically effective in some cases with hypercitricemia nonresponsive to vitamin C, and moreover individual subjective symptoms such as gingival bleeding upon brushing, itchy feeling and gnawing dull pain have been alleviated with the improvement of fatigue and loss of appetite, systemically. On the basis of these new findings, this invention has been perfected.

The principal object of this invention is to provide a method of systemic therapy for severe early destructive periodontal disease, and this object is realized by administering ubioquinone to a sufferer from the disease.

Ubiquinone is also sometimes designated coenzyme Q and is one of the coenzymes which is present in animal and plant organs, and in microorganisms such as yeast, especially in the mitochondria of the cells and comprises such multiple homologues as ubiquinone 5, ubiquinone 10, ubiquinone 15 . . . ubiquinone 35, ubiquinone 40, ubiquinone 45, ubiquinone 50, etc., according to the number of units in the isoprene chain. Therefore, ubiquinone $5n$ can be isolated from the above-mentioned sources. Ubiquinone $5n$ can also be prepared advantageously by utilizing the process described in Japanese patent publication Nos. 1,877/1955 and 10,169/1957.

In the present invention, ubiquinone 35, ubiquinone 40, ubiquinone 45 and ubiquinone 50 are used singly or in combination. Among them, ubiquinone 35 is practically used.

The acute toxicity of ubiquinone 35 is $LD_{50}=4000$ milligrams per kilogram when administered intraperitoneally to mice. Toxic manifestations were not observed with daily intraperitoneal injection of 10, 20 and 50 milligrams per kilogram, respectively, in rats for 30 days and no changes were observed histologically in the pituitary, thyroid, thymus, heart, lungs, liver, adrenals, spleen, kidneys or testes.

The dose of ubiquinone in the method of this invention varies depending upon the severity of the periodontosis, blood citrate levels and administration method. However, the daily dose for an adult is generally about 5 to 1,500 milligrams per day in both oral and parenteral administration. The optimal dose of ubiquinone 35 for an adult is orally about 15 to about 30 milligrams per day and is about 10 to about 20 milligrams per day by injection varies depending upon the severity of the periodontosis, blood citrate levels and administration method. tered with ubiquinone 35 at a daily dose of 15 to 30 milligrams for 7 to 14 days or intravenously administered with ubiquinone 35 at a daily dose of 10 to 20 milligrams for 5 to 10 days, the administration restores the hypercitricemia to normal level, paralleled by alleviation of gingival symptoms, and can improve the response to local treatment.

According to the method of this invention, ubiquinone can be administered as it is or in a composition consisting of the ubiquinone and a pharmaceutically acceptable liquid or solid carrier which is not incompatible with ubiquinone. The composition can take the form of tablets, powder, granule, capsules, injection or suspension. The solid carrier, which may be admixed with ubiquinone, can be, for example, cornstarch, lactose, talc, stearic acid, magnesium stearate, gums, or the like. The liquid carrier for injection or suspension can be, for example, water, vegetable oils, detergents, surface active agents, etc.

The following illustrative examples of preparations containing ubiquinone as an active ingredient are given:

(1) A capsule containing 5.0 milligrams of ubiquinone 35 and 77.0 milligrams of granular lactose.

(2) A capsule containing 20.0 milligrams of ubiquinone 35 and 230.0 milligrams of granular lactose.

(3) A capsule containing 10.0 milligrams of ubiquinone 45 and 140.0 milligrams of granular lactose.

(4) A capsule containing 20.0 milligrams of ubiquinone 35 and 230.0 milligrams of granular lactose.

(5) An injection composition containing 10 milligrams of ubiquinone 35, 100 milligrams of surface active agent (ethylene oxide adduct of hydrogenated castor oil), 10 milligrams of benzyl alcohol, 9 milligrams of sodium chloride, and distilled water in an amount to make the whole amount 1 milliliter.

(6) An injection composition containing 10 milligrams of ubiquinone 45, 100 milligrams of surface active agent (ethylene oxide adduct of hydrogenated castor oil), 10 milligrams of benzyl alcohol, 9 milligrams of sodium chloride, and distilled water in an amount to make the whole amount 1 milliliter.

(7) Vial injection composition containing 50 milligrams of ubiquinone 50, 500 milligrams of polyethylene oxide sorbitan monoleate, 50 milligrams of benzyl alcohol, 45 milligrams of sodium chloride and distilled water in an amount to make the whole amount 5 milliliters.

(8) Vial injection composition containing 100 milligrams of ubiquinone 35, 1,000 milligrams of surface active agent (ethylene oxide adduct of hydrogenated castor oil), 100 milligrams of benzyl alcohol, 90 milligrams of sodium chloride, and distilled water in an amount to make the whole amount 10 milliliters.

(9) A capsule containing 100 milligrams of ubiquinone 45 and vegetable oil.

(10) A capsule containing 100 milligrams of ubiquinone 40 and 250 milligrams of granular lactose.

Test cases exhibiting the characterization of this invention are as follows. In the following test cases, the abbreviations "mg." and "dl." refer to "milligram(s)" and "deciliter," respectively.

TEST CASES

(1) Medicine used

Ubiquinone 35

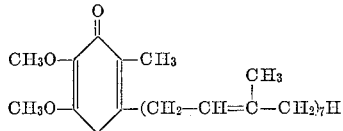

(2) Subjects

The normal range of blood citrate content for 60 cases was 1.0–2.5 mg./dl.

Only those 10 individuals who presented clinical and radiographic signs of severe destructive periodontal disease without much apparent deposition of calculus and whose fasting blood citrate levels were above 2.5 mg./dl. were selected for assay. They had a nearly normal occlusion and their gingival symptoms were not improved by simple repeated mouth washing with Rivanol (2-ethoxy-6, 9-diamino-acridinium hydrochloride) solution.

(3) Administration and dosage

Usually the daily dose is 10 to 20 mg. intravenously every day, for 5 to 10 days or every two days, 5 to 10

TABLE 1.—EFFECT OF CLINICAL ADMINISTRATION OF UBIQUINONE 35 ON HYPERCITRICEMIA IN PATIENTS WITH SEVERE PERIODONTAL DISEASE

| No. of cases | Name of patient | Age | Sex | Blood citrate (mg./dl.) | | Administration | Dose (mg./day) | Period (days) | Effectiveness (restoration of blood citrate to normal) | Gingival subjective symptoms | | | | | | | | Systemic subjective symptoms | |
|---|---|---|---|---|---|---|---|---|---|---|---|---|---|---|---|---|---|---|---|
| | | | | Before | After | | | | | Bleeding | Itchy feeling Before | Gnawing pain Before | Bleeding | Itchy feeling After | Gnawing pain After | | Fatigue, loss of appetite Before | Fatigue, loss of appetite After |
| 1 | T.M. | 20 | ♀ | 3.3 | 1.9 | Injection | 10 | 10 | Effective | − | ++ | ++ | − | + | − | | ++ | − |
| 2 | S.Y. | 24 | ♂ | 3.4 | 2.0 | do | 10 | 5 | do | ++ | − | ++ | + | − | − | | ++ | − |
| 3 | Y.B. | 35 | ♀ | 3.4 | 2.2 | do | 10 | 10 | Noneffective | ++ | ++ | ++ | + | ++ | ++ | | ++ | + |
| 4 | Y.K. | 27 | ♂ | 2.7 | 2.0 | do | 10 | 5 | Effective | ++ | ++ | ++ | ++ | + | + | | ++ | − |
| 5 | A.T. | 22 | ♀ | 2.6 | 1.9 | do | 20 | 7 | do | − | ++ | ++ | − | − | − | | ++ | − |
| 6 | T.K. | 26 | ♂ | 3.7 | 2.3 | Capsule | 15 | 7 | Noneffective | + | ++ | ++ | + | + | + | | ++ | + |
| 7 | F.T. | 28 | ♀ | 2.9 | 2.0 | do | 15 | 7 | Effective | + | ++ | ++ | + | − | + | | ++ | − |
| 8 | S.M. | 22 | ♂ | 5.0 | 3.5 | do | 30 | 14 | do | − | ++ | ++ | − | − | + | | ++ | + |
| 9 | S.S. | 31 | ♀ | 5.4 | 3.5 | do | 30 | 10 | do | − | ++ | ++ | − | − | + | | ++ | + |
| 10 | H.K. | 33 | ♀ | 3.7 | 2.1 | do | 30 | 10 | do | − | ++ | ++ | − | − | − | | ++ | − |

Note.—Intensity of subjective symptoms: −, <+, <++, +++. Cases 5, 8, 9 did not respond to vitamin C.

times. The daily dose of 15 to 30 mg. is administered orally every day for 7 to 14 days. Ubiquinone is used appropriately in the formulations 1 and 2 (oral) and 5 (intravenous).

(4) Clinical observations

The therapeutic effect of ubiquinone was evaluated on the restoration to normal of both the blood citrate level and subjective symptoms in the patients who received no local treatment except for mouth washing in Rivanol solution. This investigation was carried out during the months of May to August.

(5) Determination of blood citrate

The citric acid in the blood was determined by the method of Ettinger, Goldbaum and Smith (Journal of Biological Chemistry, vol. 199, 531–536 (1952)).

(6) Results

Table 1 summarizes clinical results. The restoration of blood citrate level was judged as "effective" on those subjects who showed a reduction of more than 1.2 mg./dl. because the daily variations of same individuals were within ±0.6 mg./dl. Four of the five cases responded to ubiquinone in both the injected group and the capsule-treated group. In the effective cases, most patients reported improvement of subjective gingival symptoms such as the arrest of gingival bleeding upon brushing, disappearance of itchy feeling and alleviation of gnawing dull pain accompanied with systemic improvement of fatigue and loss of appetite. Cases 5, 8, 9 who had never responded to the administration of vitamin C showed a dramatic response to ubiquinone. No side effect of this drug was observed.

What we claim is:

1. A method for the treatment of severe periodontosis which comprises administering to a human patient suffering from the disease a ubiquinone of the formula

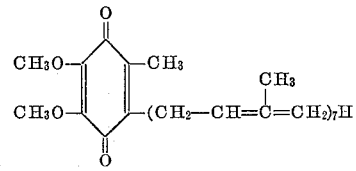

in an amount of about 5–1500 milligrams per day for an adult.

2. A method as claimed in claim 1 wherein the ubiquinone is administered orally or parenterally.

3. A method as claimed in claim 2 wherein the ubiquinone is administered orally in an amount of about 15 milligrams to about 30 milligrams per day.

4. A method as claimed in claim 2 wherein the ubiquinone is administered by injection in an amount of about 10 milligrams to about 20 milligrams per day.

References Cited

UNITED STATES PATENTS 3,317,381    5/1967    Umehara _____ 424—94

JEROME D. GOLDBERG, Primary Examiner